(12) United States Patent
Crane et al.

(10) Patent No.: US 6,671,132 B1
(45) Date of Patent: Dec. 30, 2003

(54) MICROACTUATOR MAGNETIC CIRCUIT

(75) Inventors: Peter Crane, Richfield, MN (US); Derek A. Lewis, Minneapolis, MN (US); Zine-Eddine Boutaghou, Vadnais Heights, MN (US); Lee Walter, Plymouth, MN (US)

(73) Assignee: Seagate Technology LLC, Bloomington, MN (US)

( * ) Notice: Subject to any disclaimer, the term of this patent is extended or adjusted under 35 U.S.C. 154(b) by 0 days.

(21) Appl. No.: 09/742,569

(22) Filed: Dec. 20, 2000

Related U.S. Application Data
(60) Provisional application No. 60/175,564, filed on Jan. 11, 2000.

(51) Int. Cl.[7] .............................................. G11B 5/596
(52) U.S. Cl. ..................................................... 360/294.5
(58) Field of Search ........................... 360/294.5, 294.4, 360/294.3

(56) References Cited

U.S. PATENT DOCUMENTS

| | | | |
|---|---|---|---|
| 5,834,864 A | 11/1998 | Hesterman et al. ............ 310/40 |
| 5,867,347 A | 2/1999 | Knight et al. ................ 360/104 |
| 5,898,544 A | 4/1999 | Krinkle et al. ............... 360/104 |
| 5,901,010 A | 5/1999 | Glover et al. ............ 360/78.12 |
| 5,920,441 A | 7/1999 | Cunningham et al. ... 360/78.05 |
| 5,936,805 A | 8/1999 | Imaino ......................... 360/104 |
| 5,959,808 A | 9/1999 | Fan et al. ..................... 360/106 |
| 5,978,752 A | 11/1999 | Morris ........................ 702/186 |
| 5,982,569 A | 11/1999 | Lin et al. ........................ 360/67 |
| 5,982,585 A | 11/1999 | Fan et al. ..................... 360/104 |
| 5,986,853 A | 11/1999 | Simmons et al. ............ 360/104 |
| 6,122,149 A * | 9/2000 | Zhang et al. ............. 360/294.5 |
| 6,157,521 A * | 12/2000 | Utsunomiya ................. 360/260 |
| 6,163,434 A * | 12/2000 | Zhang et al. ................ 360/106 |
| 6,249,064 B1 * | 6/2001 | Bradbury ....................... 310/22 |
| 6,256,175 B1 * | 7/2001 | Zhang et al. ............. 360/294.5 |
| 6,268,984 B1 * | 7/2001 | Boutaghou ............... 360/294.5 |
| 6,282,066 B1 * | 8/2001 | Bonin ....................... 360/294.1 |
| 6,295,185 B1 * | 9/2001 | Stefansky ................. 360/264.5 |
| 6,351,354 B1 * | 2/2002 | Bonin ....................... 360/294.6 |
| 6,414,822 B1 * | 7/2002 | Crane et al. .............. 360/294.5 |
| 6,446,326 B1 * | 9/2002 | Mastromatteo et al. .. 29/603.04 |

OTHER PUBLICATIONS

Koganezawa et al., A Flexural Piggyback Milli–Actuator over 5 Gbit/in$^2$ Density Magnetic Recording, IEEE Trans. on Magnetics, vol. 32 No. 5, 1996, pp. 3908–3910.

* cited by examiner

Primary Examiner—Robert S. Tupper
(74) Attorney, Agent, or Firm—Kinney & Lange, P.A.

(57) ABSTRACT

An improved microactuator magnetic circuit having a simplified assembly, reduced field leakage, and improved passivation methods is disclosed. To simplify assembly, a single magnet is polarized in two magnetic regions so that the single magnet is functionally similar to two separate magnets. In addition, the magnetic circuit can be produced without a top keeper. Field leakage is reduced by expanding the bottom keeper. Finally, corrosion-resistant alloys with acceptable magnetic properties are used in forming the keeper.

19 Claims, 9 Drawing Sheets

MICROACTUATOR MAGNETIC CIRCUIT

CROSS-REFERENCE TO RELATED APPLICATION(S)

This application claims priority from Provisional Application No. 60/175,564 filed Jan. 11, 2000, for "Improved Microactuator Magnetic Circuit" by Peter Crane, Derek A. Lewis, Zine-Eddine Boutaghou, and Lee Walter.

BACKGROUND OF THE INVENTION

The present invention relates to a disc drive microactuator, and more particularly to a magnetic microactuator utilizing a magnetic circuit having simplified assembly, reduced field leakage, and improved passivation methods.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head over a selected track on a disc. The large-scale motor lacks sufficient resolution to effectively accommodate high track density discs. Thus, a high resolution head positioning mechanism, or microactuator, is necessary to accommodate the more densely spaced tracks.

Various microactuator designs have been considered to accomplish high resolution head positioning. One such microactuator is a magnetic microactuator assembled from various components and bonded to a suspension gimbal and head interconnect. The components include a bottom keeper, two magnets, a coil separated from the magnets by an air gap, and a top keeper. Once assembled, the components form a vertically disposed magnetic circuit. The magnetic circuit makes use of two distinct materials, a magnetically hard magnet material, and a magnetically soft keeper.

In previous magnetic microactuators, the hard magnet material was divided into two discrete components. These included an upwardly polarized magnet with a north pole adjacent the air gap, and a downwardly polarized magnet with a south pole adjacent the air gap. These magnets are easy to polarize by placing the magnets in a strong and uniform magnetic field. However, it is difficult to assemble the two small magnets because the magnets tend to stick to each other due to their strong magnetic attraction.

The magnetically soft keeper material is necessary to reduce field leakage in the magnetic circuit. Specifically, there is often field leakage around the edges of a bottom keeper located between magnets and disc surfaces which may de-stabilize the recorded bits on the disc. A further problem of the keepers is that the magnetically soft keeper material typically used in magnetic microactuators is not resistant to corrosion. Therefore, keepers are typically nickel plated or otherwise passivated, which not only increases their cost, but also poses manufacturing problems, especially when the coil is fabricated on the top keeper.

Therefore, there is a need in the art for a microactuator design having simplified assembly, reduced field leakage, and improved passivation methods.

BRIEF SUMMARY OF THE INVENTION

The present invention relates to an improved magnetic microactuator with a single magnet, reduced field leakage, and improved passivation methods. The single magnet is polarized on a special fixture into two magnetic regions. There is a transition zone between the two regions with weak magnetization. By making the transition zone as small as possible, the single magnet design is made functionally similar to the prior art dual magnet design. The magnet is made of a suitable alloy which allows for magnetization within a desired temperature and current range.

To reduce field leakage from the magnetic circuit, the bottom keeper is expanded to address the problem of field leakage around the edges of the bottom keeper. The thickness of the expanded region may vary widely while still performing the desired shielding function. A preferred thickness surrounding the magnet is about twice the thickness beneath the magnet. The magnetic microactuator further does not have a top keeper. To make the keeper material more resistant to corrosion, corrosion-resistant alloys with acceptable magnetic properties are substituted for prior art keeper material.

DETAILED DESCRIPTION

Figure 1:
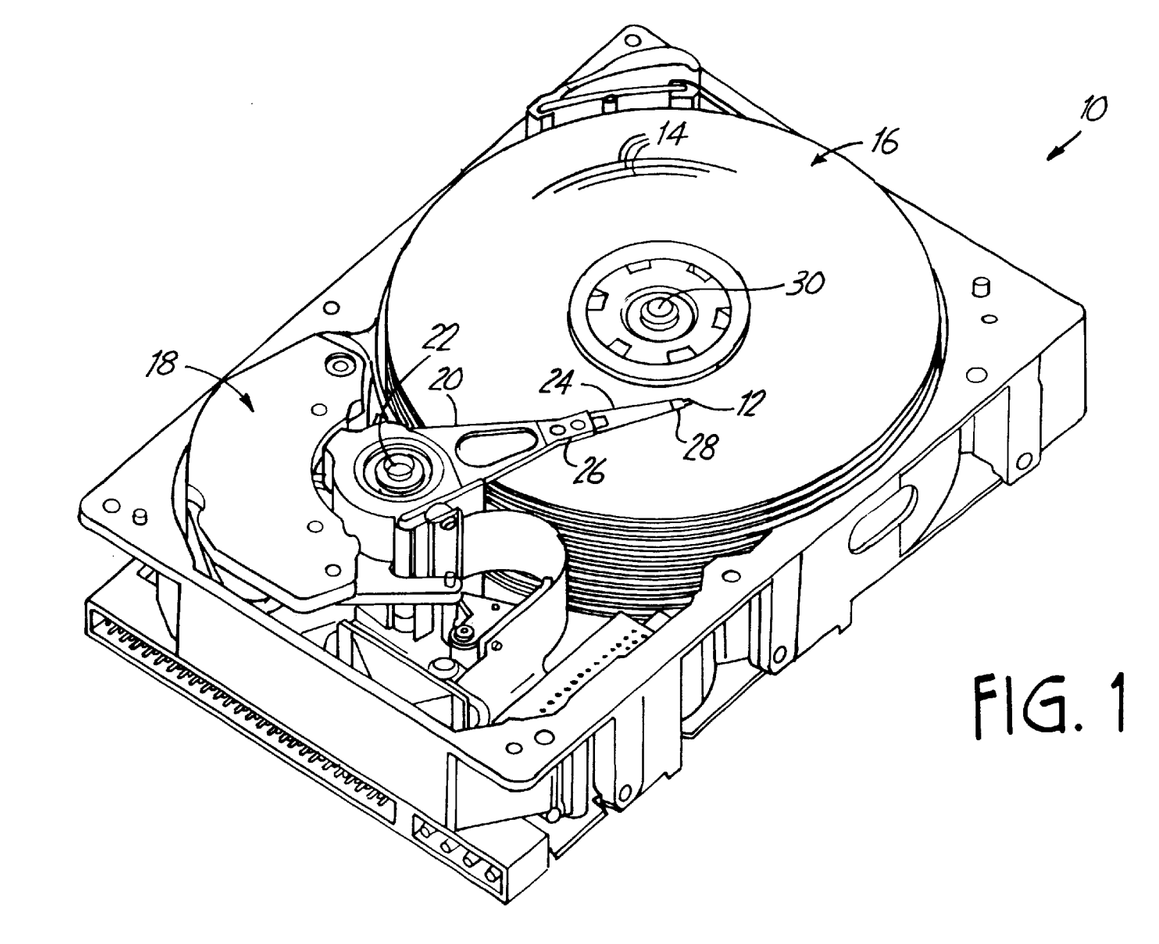
FIG. 1 is a perspective view of a disc drive actuation system for positioning a slider over tracks of a disc.

FIG. 1 is a perspective view of a disc drive actuation system 10 for positioning slider 12 over track 14 of disc 16. Actuation systems 10 includes voice coil motor (VCM) 18 arranged to rotate actuator arm 20 on a spindle around axis 22. Head suspension 24 is connected to actuator arm 20 at head mounting block 26. Flexure 28 is connected to an end of head suspension 24, and carries slider 12. Slider 12 carries a transducing head (not shown in FIG. 1) for reading and/or writing data on concentric tracks 14 of disc 16. Disc 16 rotates around axis 30, so that windage is encountered by slider 12 to keep it aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks sufficient resolution and frequency response to position a transducing head on slider 12 precisely over a selected track 14 of disc 16. Therefore, a higher resolution actuation device is necessary.

Figure 2:
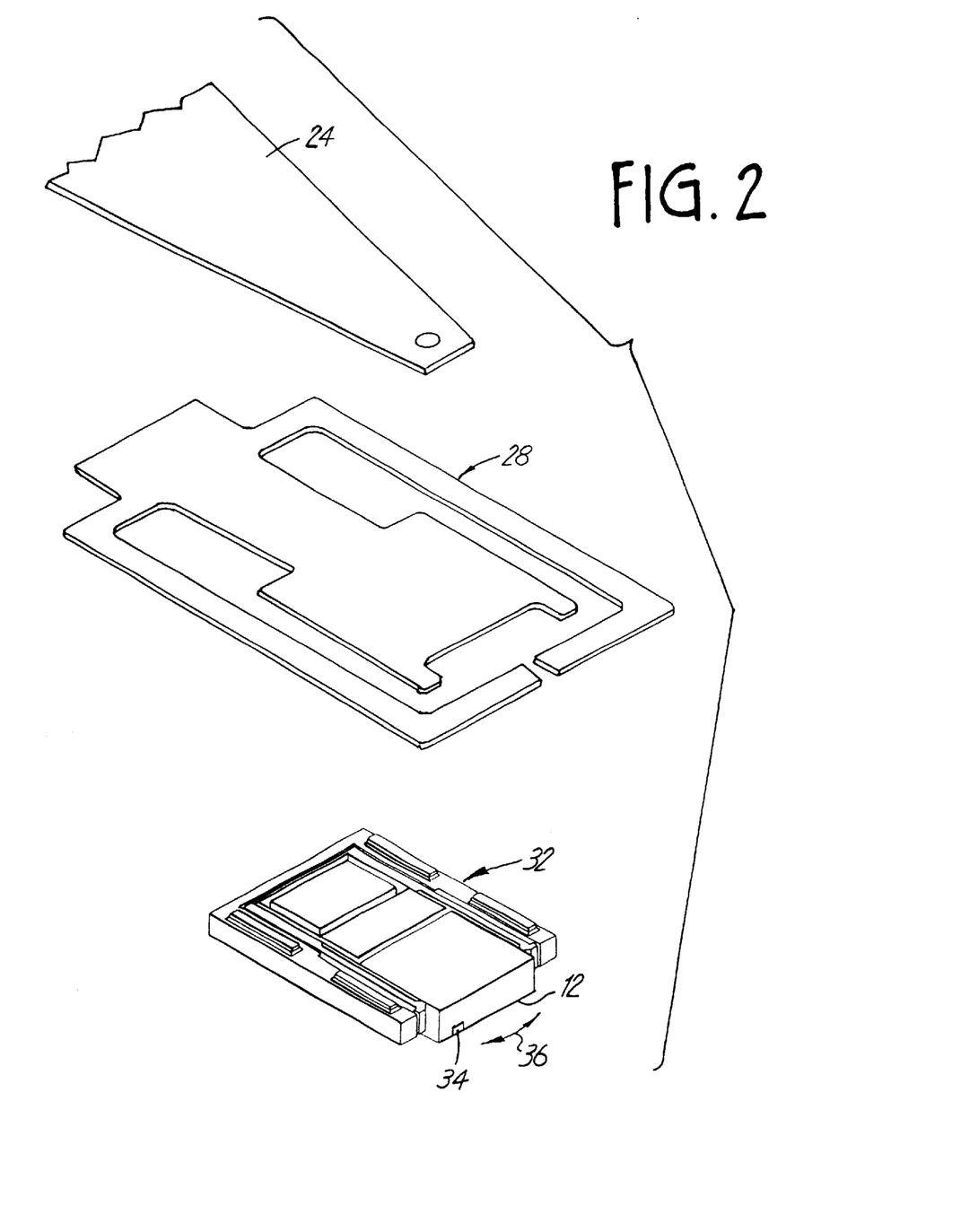
FIG. 2 is an exploded perspective view of a portion of a disc drive including a microactuator according to the present invention.

FIG. 2 is an exploded perspective view of a portion of a disc drive including microactuator 32 according to the present invention. Flexure 28 is attached to load beam 24, and microactuator 32 is attached to flexure 28 to carry slider 12 above a surface of disc 16 (FIG. 1). Transducing head 34 is carried by slider 12 to transduce data with the disc.

In operation of the disc drive, load beam 24, flexure 28 and microactuator 32 carrying slider 12 are all moved together as coarse positioning is performed by VCM 18 (FIG. 1) moving actuator arm 20 (FIG. 1). To achieve fine positioning of transducing head 34, microactuator 32 generates a force which causes bending of the beam springs of the microactuator. As a result, the portion of microactuator 32 carrying slider 12 moves slightly with respect to flexure 28 in the direction of arrows 36, displacing transducing head 34 with high resolution for precise positioning over a selected track of the disc.

Figure 3:
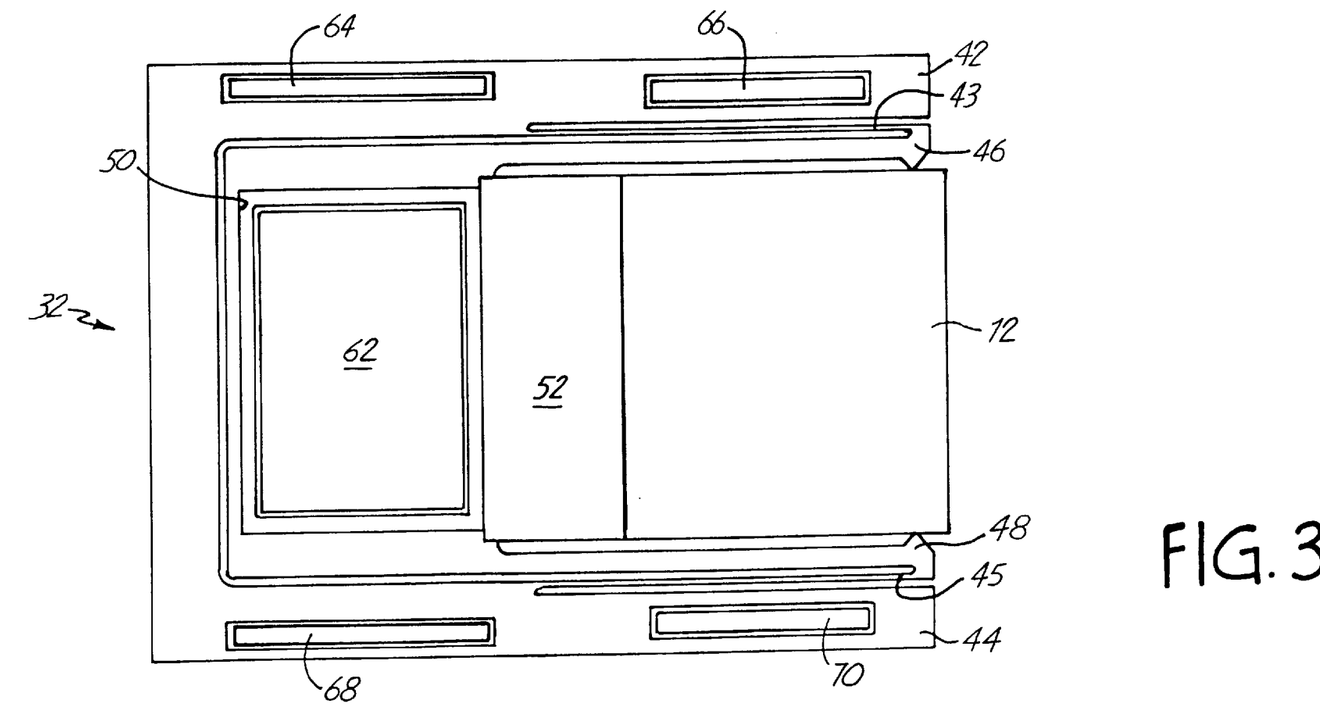
FIG. 3 is a top plan view of the microactuator.

FIG. 3 is a top view of microactuator 32 according to the present invention. Microactuator 32 includes outer pre-loading bars 42 and 44 and inner alignment clips 46 and 48, with inner alignment clips 46 and 48 clamping against the sides of slider 12 at a frontal portion (to the right in FIG. 3) thereof. Flexible beam springs 43 and 45 extend between the proximal ends of pre-loading bars 42 and 44 and the distal ends of alignment clips 46 and 48. A tub 50 is formed in the substrate of microactuator 32 opposite transducing head 34 of slider 12, and structural bond pad 52 is provided for attachment to the top surface (opposite the air-bearing surface) of slider 12. The tub 50 contains a magnet 62 and has a ferromagnetic keeper material lining its bottom surface. Standoffs 64, 66, 68 and 70 are formed on outer pre-loading bars 42 and 44, to be borne upon so as to apply pre-load, force to microactuator 32 as it supports slider 12 over the surface of the disc.

Figure 4:
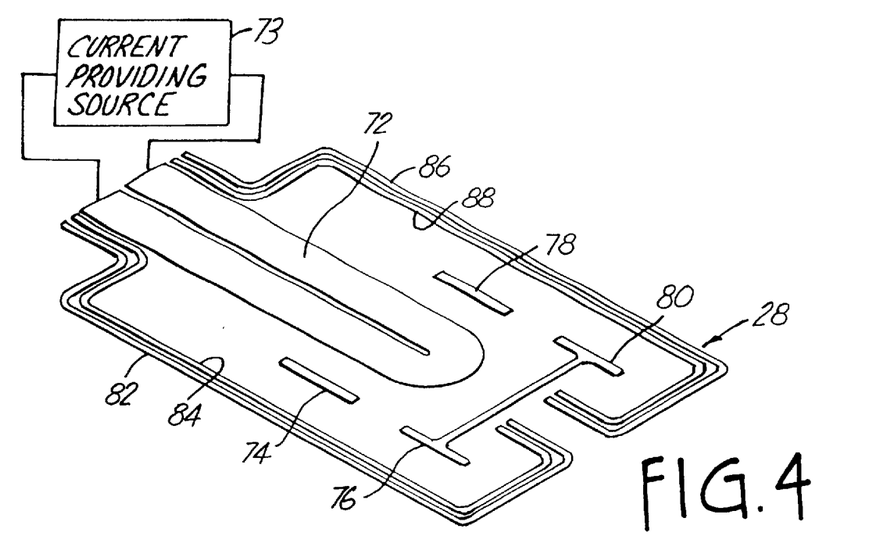
FIG. 4 is a perspective view of the underside of a flex circuit for use with a microactuator of the present invention.

FIG. 4 is a perspective view of the underside of flexure 28 for use with microactuator 32 of the present invention. Flexure 28 forms the substrate of a flex circuit including conductive coil 72 connected to current-providing source 73, and standoffs 74, 76, 78 and 80. Standoffs 74, 76, 78 and 80 are aligned with respective standoffs 64, 66, 68 and 70 of microactuator 32 to apply pre-load force to microactuator 32 as it carries slider 12 (FIG. 3). In addition, conductive leads 82, 84, 86 and 88 are provided to electrically contact transducing head 34 carried by slider 12 (FIG. 3).

Figure 5:
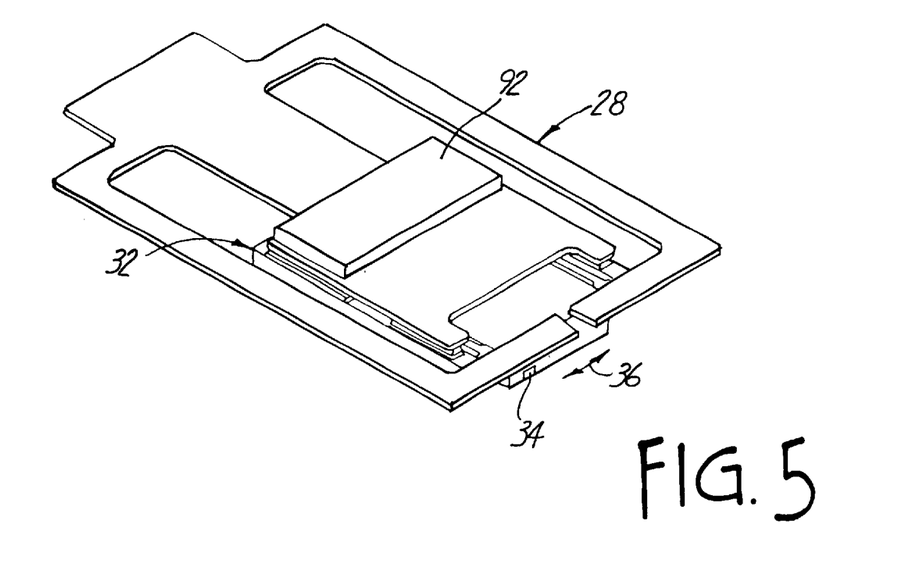
FIG. 5 is a perspective view of the microactuator of the present invention attached to the flex circuit for use in a disc drive.

FIG. 5 is a perspective view of microactuator 32 of the present invention attached to the underside of flexure 28 for use in a disc drive. Flexure 28 further includes ferromagnetic keeper 92 formed on its top surface opposite coil 72 (FIG. 4). The coil 72 is positioned above the magnet 62 located in the tub 50 of microactuator 32 (FIG. 3). A vertically arranged magnetic circuit is thereby formed from the bottom keeper (the ferromagnetic lining of tub 50), magnet 62, an air gap formed by the spacing between the magnet 62 and coil 72, the windings of coil 72 itself, and top keeper 92.

The arrangement of flexure 28 and the design of microactuator 32 are such that circulating current through the windings of coil 72 results in cross-track movement of slider 12 in a horizontal plane generally parallel to the surface of the disc. The movement is in the direction of arrows 36, and is permitted by the flexibility of beam springs 43 and 45 (FIG. 3). Outer pre-loading bars 42 and 44 having standoffs 64, 66, 68 and 70 thereon effectively form the stator of the microactuator, with the magnet 62, slider bond pad 52, slider 12, flexible beams 43 and 45 and inner alignment clips, 46 and 48 effectively forming the rotor of the motor (FIG. 3). Thus, lateral movement of the magnet 62 affects the cross-track (horizontal) position of slider 12 with respect to outer pre-loading bars 42 and 44 and standoffs 64, 66, 68 and 70, and also with respect to flexure 28 and to the tracks of the disc.

Figure 6:
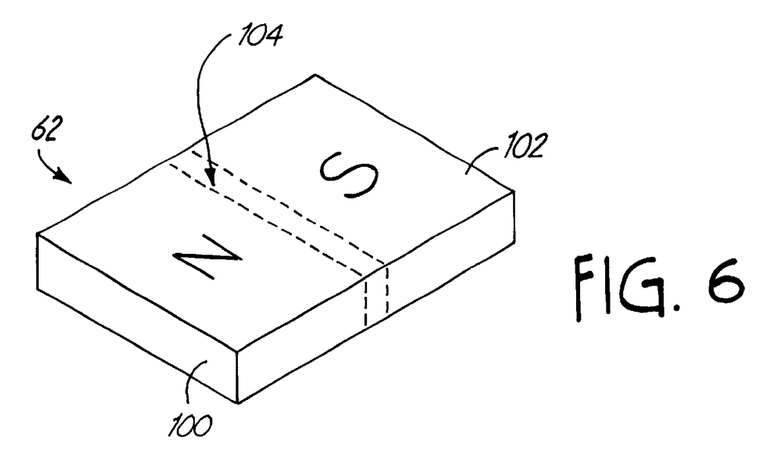
FIG. 6 is a perspective view of a single magnet with oppositely poled regions and a transition zone between the regions.

FIG. 6 is a perspective view of the magnet 62 used in the microactuator 32 of the present invention. In prior art microactuators, two magnets were used in the magnetic circuit. However, as mentioned above, one magnet was polarized upwardly with a north pole adjacent the air gap, while the other magnet was polarized downwardly with a south pole adjacent the air gap. Though the magnets were easy to polarize, it was difficult to assemble the two small magnets because of the tendency of the magnets to stick together due to their strong magnetic attraction. The single magnet 62 of the present invention thus greatly eases assembly of the micro actuator.

The magnet 62 contains two oppositely poled regions, a north pole 100 and a south pole 102. Between the north pole 100 and south pole 102 is a transition zone 104 having weak magnetization. By making the transition zone 104 as small as possible, the magnet 62 functions similar to the two magnets of the prior art. Thus, it is preferable to keep the transition zone 104 as small as possible, for example about 10% of the total magnet volume.

The size of the transition zone on 104 is dependent in part on the current running through the magnetizing fixture used to create the two poled regions 100,102 of the magnet 62. In creating the magnet 62, the current in the magnetizing fixture is limited by the power supply, which is typically a bank of capacitors. The current in the fixture also induces heating. Therefore, the transition volume of the magnet 62 cannot be completely eliminated without either exceeding the capacity of the power supply or overheating the fixture.

With these two constraints in mind, the materials from which the magnet 62 can be created include a Samarium Cobalt 1,5 alloy ("SmCo 1,5") a Samarium Cobalt 2,17 alloy ("SmCo 2,17"), and Neodymium Iron Boron ("NdFeB"). SmCo 1,5 is a nucleation type alloy, while SmCo 2,17 is a pinning type alloy. These terms refer to the mechanism by which the magnet domains within the materials are held in alignment. The nucleation type alloys typically require much lower field strength to magnetize than the pinning type alloys. The lower field strength required to magnetize the SmCo 1,5 as compared to the field strength required to magnetize SmCo 2,17 allows a reduced current in the magnetizing fixture for magnets formed of SmCo 1,5.

Figure 6A:
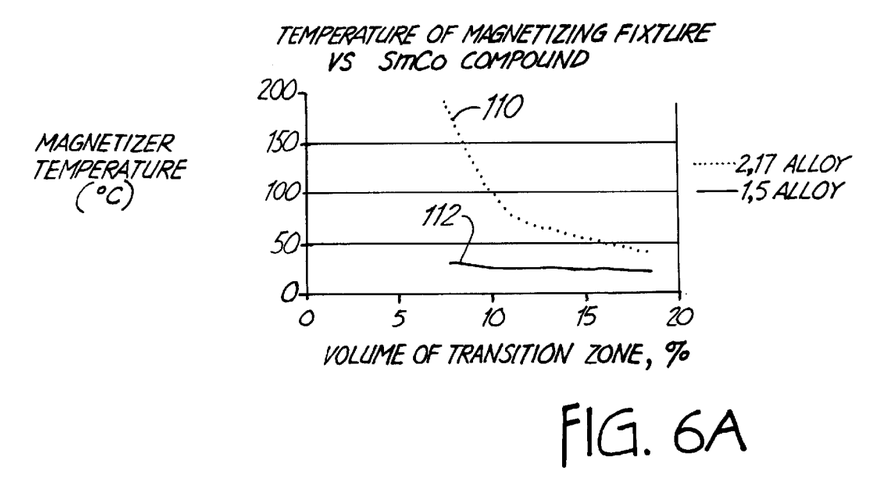
FIG. 6A is a graphical depiction of the volume of the transition zone of a dual pole magnet and the fixture temperature reached while polarizing the dual pole magnet.

Typically, the fixture has a trade off between fixture temperature and transition in volume as shown in FIG. 6A. FIG. 6A shows the volume of transition zones as a percentage of the total volume of the magnet along the x-axis, with the temperature in degrees Celsius along the y-axis. A curve 110 for the SmCo 2,17 alloy shows that as the volume of the transition zone decreases, the temperature of the magnetizing fixture greatly increases. In contrast, the curve 112 of the SmCo 1,5 alloy shows only a small effect on the temperature of the magnetizing fixture as the volume of the transition zone is decreased.

In order to completely magnetize 90% of the magnet volume, the fixture must be run at 100° C. when magnetizing the SmCo 2,17 alloy. Due to the lower current required, the same fixture magnetizes the SmCo 1,5 alloy at only 25° C. The SmCo 1,5 alloy is preferred because of this lower temperature operation, which prolongs the fixture life and reduces factory downtime for fixture repairs or replacements.

Another suitable material for creating the magnets 62 is NdFeB. A drawback of using NdFeB compounds is that such compounds are typically sensitive to temperature such that they will demagnetize when operated above a given temperature limit. Most NdFeB grades are limited to operation at 80° C. or less. Special grades of NdFeB are available, however, which will tolerate temperatures up to 120° C. However, these grades have high coercivity, and therefore experience a similar difficulty in magnetization as that seen in the SmCo 2,17 alloy.

For all magnets, regardless of the material from which they are formed, some form of plating or coating of the magnet is required to prevent magnet particles from flaking off and erasing recorded bits on the disc surface. Both the SmCo 1,5 and SmCo 2,17 alloys can be electro-nickel plated. Magnets made of the SmCo alloys are typically nickel plated to a thickness of between about 2–5 microns. The electro-nickel plating of these SmCo magnets has no discernible affect on their magnetic properties.

The NdFeB magnets are slightly harder to coat with an anti-corrosive coating. If the NdFeB magnets are electro-nickel plated, the electro-nickel plating induces a magnetically "dead" layer beneath the surfaces of the NdFeB material. The dead layer is typically about 50 microns thick and is thought to result from metal hydride formation in the subsurface layer. Since the magnet is only about 125 microns thick, an NdFeB magnet which is electro-nickel plated would have a fully active volume of less than one fifth of the apparent volume, which is unacceptable.

One alternative to giving the NdFeB magnets, an anti-corrosion coating is to use a Metallo-Organic Chemical Vapor Deposition (MOCVD) process to deposit a metal layer on the magnets. The metal layer prevents any magnetic particles from flaking off, just as electro-nickel plating a SmCo alloy does.

In MOCVD, the metal to be deposited is bonded chemically or electrostatically to an organic precursor molecule, such as Nickel Carbonyl. The metallo-organic molecule may be in a solid, liquid, or gaseous phase. Solid precursors are heated to increase their vapor pressure and are introduced into a chamber via heated gaseous line. Liquid precursors are similarly heated to increase their vapor pressure and are introduced as the gaseous analogs. Commonly, liquid precursors are dip or spray coated onto the parts. Gaseous precursors are introduced into the CVD reaction chamber by standard flow methods.

The preferred MOCVD process for the magnets 62 made of NdFeB is a process using a unique fluidized bed reactor. The magnets are placed in the reactor vessel and suspended in an inert gas stream, such as nitrogen, or in a liquid containing the reactant metallo-organic molecules. Upon heating the reactor vessel, the metal ions crack free from the organic part of the precursor molecules, and attached themselves to the NdFeB material. Because the process takes place without releasing free reactive hydrogen, the problem of the magnetically dead layer is avoided.

A preferred, metal for MOCVD deposition is aluminum. The precursor molecules can be Triethylaluminum (TEA), Trimethylamine alane (TMAA) Trimethyl alane (TMA) Dimethylamine alane (DMEAA) or Trimethylamine aluminaborane (TMAAB). This is because the reaction takes place at a very low temperature of between 82° and 100° C. Also, a well defined chemical pathway exists for this metal, as shown below:

Other suitable metals available for the MOCVD process include nickel, gold, platinum, and palladium. Any of these metals may be suitable depending on the specifics nature of the process and the requirements for the coatings.

Other options for coating to reduce the corrosion affects of the magnet 62 include carbon or a polymeric film coating. Carbon is a well known coating material, and if it can be applied with sufficient density, it offers good corrosion protection. One such dense carbon is the Diamond Like Carbon film, such as that offered by Commonwealth Scientific and other companies. Another possible film is pyrolytic carbon, which has proven to be particularly useful in the medical industry. Examples of possible suitable polymeric film coatings include Parylene from Speciality Coating Systems of Indianapolis, Ind., and an organic coating from IRE Coatings of Eden Valley, Minn. These films are dense enough to provide corrosion and protection when applied in the two to ten micron thickness range.

In addition to the magnet 62, the magnetic circuit of the microactuator also comprises a top keeper 92 and a bottom keeper located in the tub 50 (FIGS. 5 and 3). The soft magnetic keeper material typically used in prior art microactuators was Permendur (the trade name of an alloy made of 49% Iron, 49% Cobalt, and 2% Vanadium). Permendur has the highest saturation magnetization of any commercial alloy, allowing the thickness of the keepers to be minimized. Permendur also has excellent permeability, and thus is successful in preventing field leakage. However, one disadvantage of Permendur is that it must be coated to prevent corrosion. The anti-corrosion coating of Permendur was typically accomplished by nickel plating, which adds about 20% to the piece part cost and is very difficult to integrate with a coil building process, especially when the coil is fabricated on the top keeper.

Thus, it is desired to find a keeper material which is resistant to corrosion, yet exhibits the desired magnetic properties. Table 2 below lists alternative soft magnetic materials having high corrosion resistant which are suitable for the present invention.

TABLE 2

| Alloy | Carbon % Maximum | Chromium, % | Saturation, Tesla | Permeability |
|---|---|---|---|---|
| Permendur | — | — | 2.40 | 2120 |
| 430 Stainless Steel | 0.12 | 17 | 1.61 | 1920 |
| 409 Stainless Steel | 0.08 | 11 | 1.87 | 2460 |
| Chrome-Core 12 | 0.03 | 12 | 1.70 | 3100 |
| Chrome-Core 8 | 0.03 | 8 | 1.75 | 3100 |

Table 2 shows the saturation in Tesla for five alloys along with the maximum Carbon percentage of the alloy, the percentage of Chromium of the alloy, and the permeability. As can be seen in Table 2, Permendur offers the highest saturation. However, as noted above, the disadvantage of Permendur is that it requires a nickel plating to prevent corrosion. Of the remaining alloys, the 409 Stainless Steel is the preferred material because it has the highest permeability and saturation magnetization of the corrosion resistant alternatives. The Chrome-Core 12 and the Chrome-Core 8 alloys exhibit high saturation, however, both Chrome-Core alloys are among the most expensive alternatives. This is because both Chrome-Core alloys must be obtained from a special melt, which greatly increases the cost. Normally, Chrome-Core is only available in a grade which contains sulfur. It would be undesirable to have any sulfur contaminating the disk drive, so it is necessary to obtain the Chrome-Core in a sulfur-free grade, which greatly increases the cost.

A final option is the 430 Stainless Steel. The 430 Stainless Steel has a highly variable permeability due to normal variation in the carbon level of the stainless steel. In addition, the high chromium level tends to reduce the saturation magnetization. As such, when all factors are balanced the 409 Stainless Steel is the preferred alloy for the keeper material.

Figure 7:
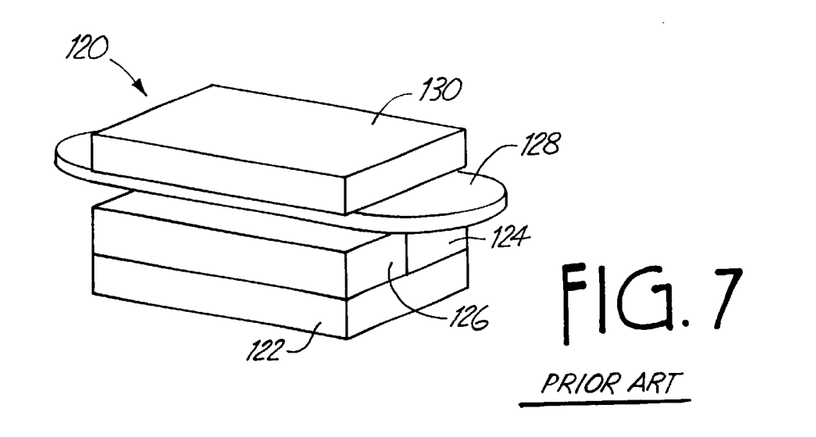
FIG. 7 is a perspective view of a prior art magnetic circuit with a bottom keeper, magnets, an air gap containing a coil, and a top keeper.

FIG. 7 is a perspective view of a prior art magnetic circuit 120 with a bottom keeper 122, magnets 124, 126, coil 128, and top keeper 130. The bottom keeper 122 is generally the same size and shape as the magnets 124, 126. As described above, the bottom and top keepers 122, 130 function to prevent field leakage from the magnetic circuit 120 which could potentially damage the disk.

Figure 8:
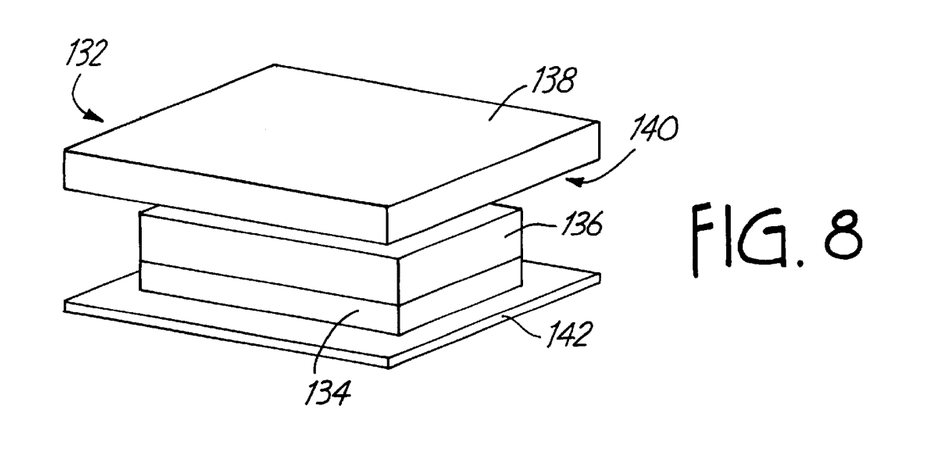
FIG. 8 is a perspective view of a magnetic circuit having a bottom keeper with a flange surrounding the magnets.
Figure 9:
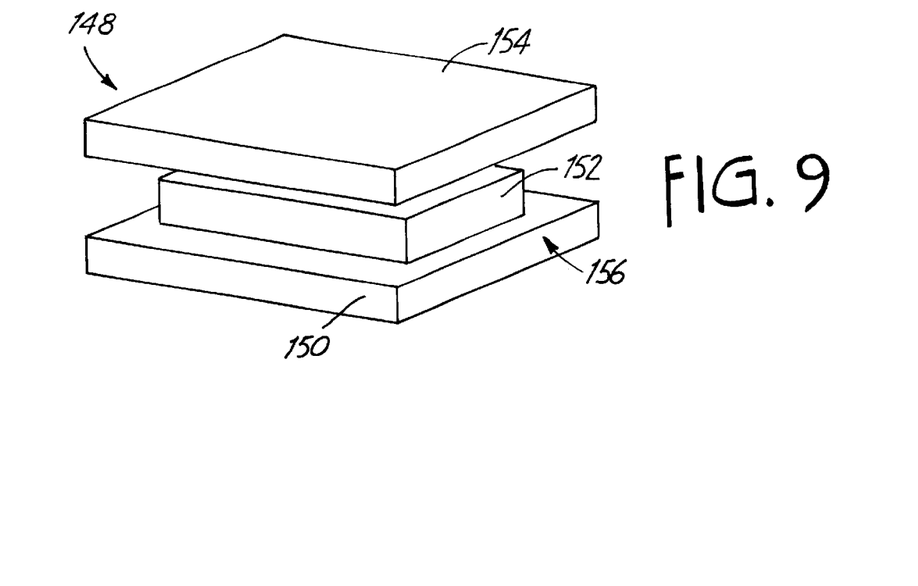
FIG. 9 is a perspective view of a magnetic circuit with a bottom keeper having a flange of uniform thickness surrounding the magnets.
Figure 10:
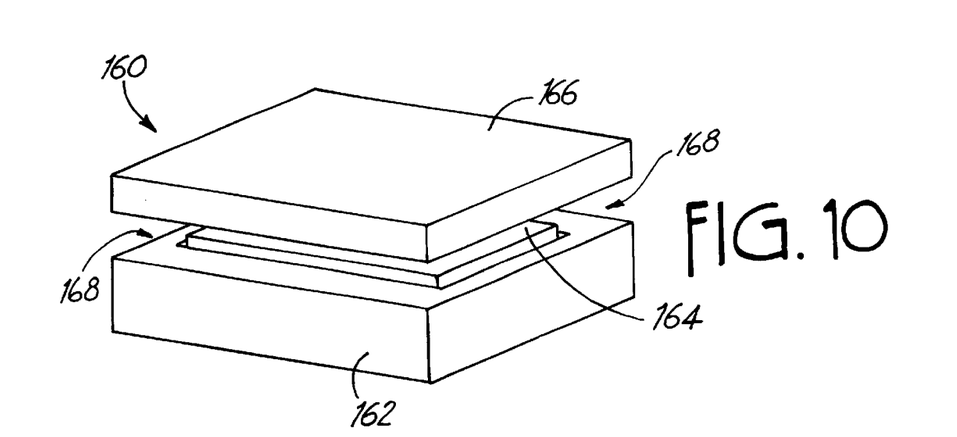
FIG. 10 is a perspective view of the magnetic circuit showing a bottom keeper with a flange of about double thickness surrounding the magnets.

FIGS. 8–10 illustrate alternate designs for the bottom keeper which improve the ability of the bottom keeper to shield the disk from any stray magnetic field emanating from the magnetic circuit. In FIGS. 8–10, the coil 128 has been removed for clarity. FIG. 8 is a perspective view of a magnetic circuit 132 having a bottom keeper 134, dual pole magnet 136, and top keeper 138. An air gap 140 exists between the magnet 136 and the top keeper 138. The bottom keeper 134 comprises a flange 142 which, surrounds the magnet 136 and extends in a plane parallel to the disk surface. The bottom keeper 134 and flange 142 can be made using a well known photochemical etching process. The bottom keeper 134 packages easily into the microactuator because the thin flange 142 extends beneath the lower surface of the microactuator substrate. Because the flange 142 extends beneath the surface of the microactuator, no change to the substrate dimensions of the microactuator is required to implement this type of expanded keeper. However, a complicated etching process with multiple mask and etch step is required to form the flange 142.

FIG. 9 is a perspective view of a magnetic circuit 148 with a bottom keeper 150, dual pole magnet 152, and top keeper 154. The bottom keeper 150 once again has a flange 156 surrounding the magnet 152. A convenient reference for the thickness of the flange 156 surrounding the magnet is the keeper thickness directly beneath the magnet. The flange 156 has the same thickness as the keeper 150 thickness beneath the magnet 152, and effectively enlarges the size of the bottom keeper 150. This expanded flange 156 on the bottom keeper 150 requires that the substrate of the microactuator likewise be expanded to contain the keeper 150. This expansion entails added costs since the yield of devices from the substrate wafer is reduced. However, the photo chemical etching of this embodiment is straight forward.

FIG. 10 is a perspective view of a magnetic circuit 160 having a bottom keeper 162, dual pole magnet 164, and top keeper 166. The bottom keeper 162 has a flange 168 of about double the thickness of the bottom keeper 162 and surrounds the magnet 164. The flange 168 effectively forms a tub into which the magnet 164 is placed. As is the case with the bottom keeper 150 shown in FIG. 9, the bottom keeper 162 shown in FIG. 10 is larger and requires substrate expansion. The etching of bottom keeper 162 is straight forward as long as the flange 168 is about double the reference thickness of the keeper 162. It is desirable to perform the etch at a machining tolerance that ensures the magnet 164 will properly fit when incorporated into the expanded keeper 162.

Table 3 below compares the shielding capability of the various embodiments. It is desired to keep the field at the disk below 20 Oersteds. All of the over size designs are suitable, so the preferred embodiment is a tradeoff between cost and the desired safety margin below the 20 Oersted threshold. Shown in Table 3 are the disc field in Oersteds and the tracking force in milliNewtons for each of the above embodiments.

| Keeper Embodiment | Disc Field, Oe | Tracking Force, mN |
| --- | --- | --- |
| Prior Art | 104.2 | 1.06 |
| Oversized, Thin Flange | 15.8 | 1.20 |
| Oversized, Normal Flange | 8.8 | 1.19 |
| Oversized, Double Thick Flange | 5.0 | 1.08 |
| Oversized, Double Thick, without Top Keeper | 13.5 | 0.60 |

The tracking force in Table 3 assumes a 20 turn coil with a 100 mA driving current circulating through it. The magnets have a coercivity of 11,900 Oe and residual magnetization of 12,300 Gauss. The designed resonant frequency of the microactuator is 1000 Hertz. The tracking force is sufficient to drive the recording head off track about 10 microns. This is about 3 times higher than typical disc drive requirements. Therefore, the tracking force is not a significant design criterion when selecting a keeper configuration.

Figure 11:
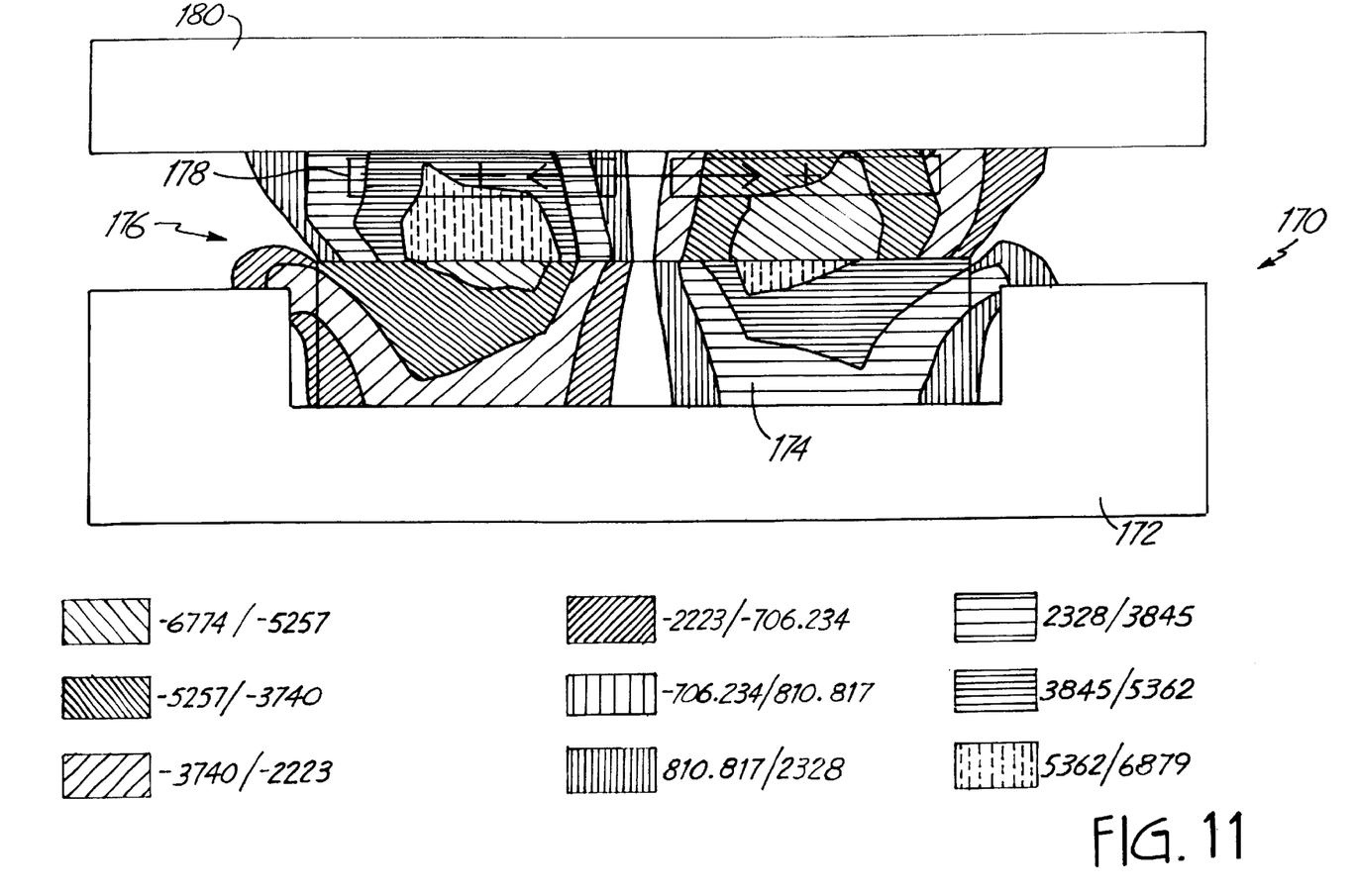
FIG. 11 is a graphical illustration of the magnetic field as contained by a top and bottom keeper.
Figure 12:
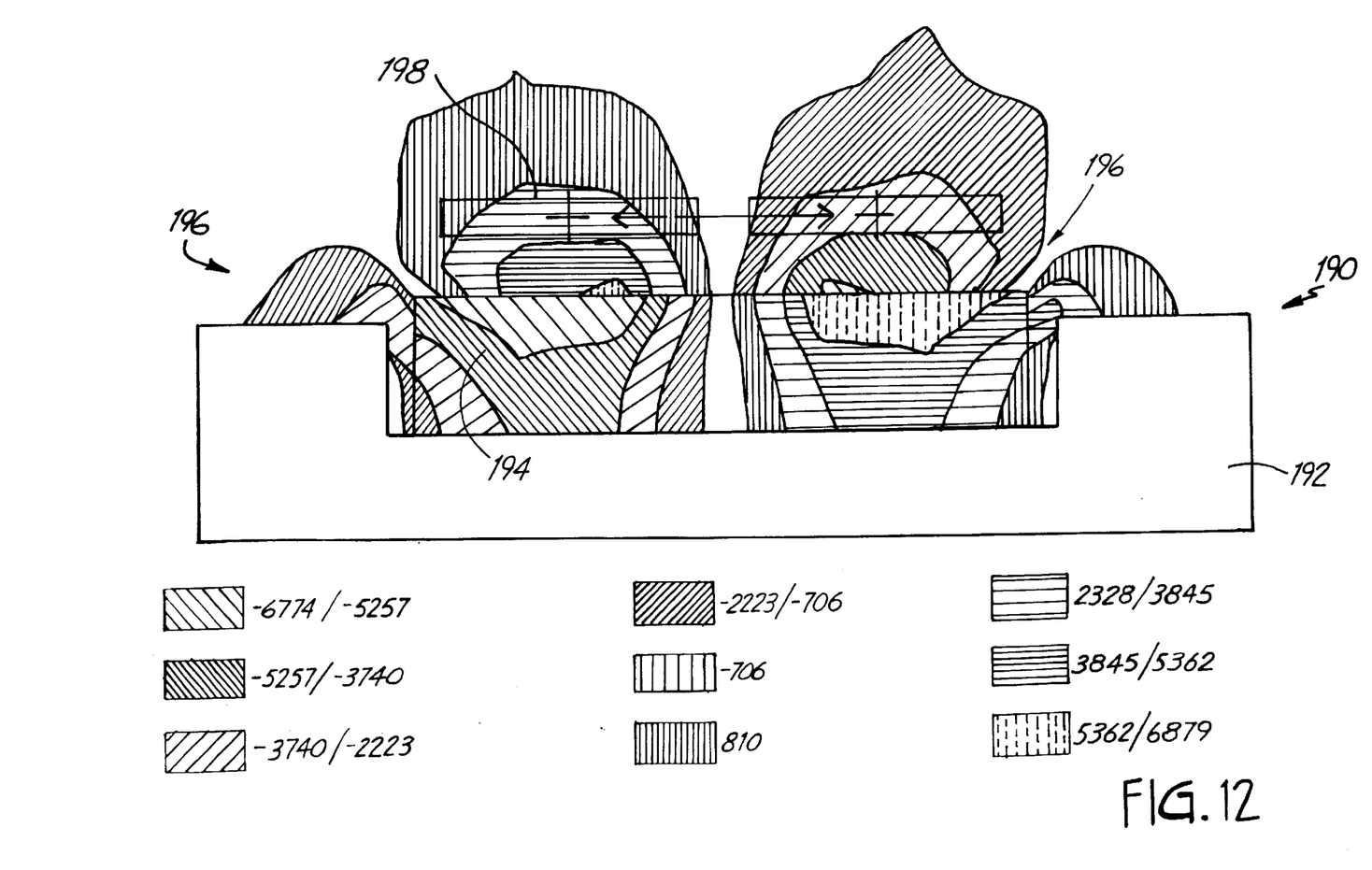
FIG. 12 is a graphical representation of the magnetic field of a microactuator without a top keeper.

As shown in FIGS. 5 and 6, the microactuator has a coil 72 fabricated on a flex circuit 28. Fabricating the coil 72 on the flex circuit 28 is relatively inexpensive, but it is difficult to incorporate a top keeper in an assembly having the coil 72 on the flex circuit 28. One option is to eliminate the top keeper all together. This allows easy assembly of the microactuator to the coil 72 without having the additional step of flipping the assembly over to bond the top keeper to the opposite side of the coil 72. FIGS. 11 and 12 illustrate the field strength of a magnetic circuit 170 having a top keeper and a magnetic circuit 190 in which the top keeper has been removed, respectively.

FIG. 11 is a cross sectional view of a magnetic circuit 170 having a bottom keeper 172, magnet 174, air gap 176, coil 178, and top keeper 180. As can be seen in FIG. 11, the top keeper contains the magnetic field so that the strength of the magnetic field is highest in the air gap.

FIG. 12 is a cross sectional view of a magnetic circuit 190 with the top keeper removed. In FIG. 12 is the bottom keeper 192, magnet 194, air gap 196, and coil 198. In comparison to the magnetic circuit 170 of FIG. 11, the magnetic field in the air gap of FIG. 12 is reduced. This is because without a top keeper, the air gap 196 is effectively longer than when a top keeper is used. Though more of the field is leaking into the air, the field is not leaking downwards toward the disc because the bottom keeper 192 has been extended to protect the disc. In addition, while the field leakage at the bottom keeper 192 is somewhat increased at the top surface of the bottom keeper 192 on both sides of the magnet 194, it is still within tolerable limits.

Removing the top keeper is a trade off between ease of manufacture and efficiency. Without the top keeper, the magnetic field spreads out so that less energy exists in the air gap and more energy exists in the demagnetization field inside the magnetic. In magnetic circuits, it is preferable to get as much of the magnet energy as possible into the air gap where it can interact with the coil. The field reduction in the air gap causes an accompanying reduction in the actuation force. This is typically not a significant problem, however, because the driving current can simply be increased to compensate in most cases. Thus, white it is not as efficient a design, removing the top keeper results in a microactuator which still operates within desirable limits.

Although the present invention has been described with reference to preferred embodiments, workers skilled in the art will recognize that changes may be made in form and detail without departing from the spirit and scope of the invention.

What is claimed is:

1. A microactuator for high resolution positioning of a transducing head in a disc drive having a recording disc rotatable about an axis, the microactuator comprising:
   a rotor for supporting and positioning the transducing head adjacent a selected track of the disc;
   a dual-pole magnet located on the rotor wherein the dual pole magnet comprises a single magnet having two oppositely poled regions separated by a transition zone;
   a coil separated from the dual-pole magnet by an air gap; and
   an expanded bottom keeper located adjacent the dual-pole magnet to contain the magnetic field associated with the magnetic circuit, wherein the dual-pole magnet, coil, and expanded bottom keeper comprise a vertical magnetic circuit for actuating the rotor.

2. The microactuator of claim 1 and further comprising a top keeper located above the coil.

3. The microactuator of claim 1 wherein the coil produces a magnetic field in response to a current so that the dual-pole magnet moves laterally in a horizontal plane generally parallel to the surface of the disc to positing the transducing head adjacent the selected track of the disc.

4. A microactuator for high resolution head positioning, the microactuator comprising:
   a stator;
   a rotor carrying a slider, the rotor being moveable with respect to the stator;
   a flexure attached to the stator;
   a coil carried by the flexure;
   a dual-pole magnet comprising a single magnet having two oppositely poled regions, wherein the dual-pole magnet is located on the rotor, and is movable laterally in response to a current provided to the coil so that the rotor is moved in a horizontal plane generally parallel to a surface of a disc; and
   a bottom keeper on the rotor located adjacent the dual-pole magnet.

5. The microactuator of claim 4 wherein the dual-pole magnet comprises two oppositely poled regions separated by a transition zone.

6. The microactuator of claim 5 wherein each oppositely poled region comprises about half of a volume of the magnet.

7. The microactuator of claim 5 wherein the transition zone is between about 5 percent and 15 percent of a volume of the magnet.

8. The microactuator of claim 5 and further comprising a coating on the dual-pole magnet to prevent particles from flaking off the dual-pole magnet.

9. The microactuator of claim 4 wherein the bottom keeper comprises a flange.

10. The microactuator of claim 9 wherein the flange has a thickness about equal to a thickness of the bottom keeper.

11. The microactuator of claim 9 wherein the flange has a thickness of about double a thickness of the bottom keeper.

12. A vertical magnetic circuit for use in a moving magnet microactuator, the magnetic circuit comprising:
   a dual-pole magnet supported by the microactuator, wherein the dual-pole magnet comprises a single magnet having two oppositely poled regions;
   a coil separated from the dual-pole magnet by an air gap; and
   an expanded bottom keeper adjacent the dual-pole magnet to contain the magnetic field associated with the magnetic circuit.

13. The vertical magnetic circuit of claim 12 wherein the dual-pole magnet comprises two oppositely poled regions separated by a transition zone.

14. The vertical magnetic circuit of claim 13 wherein each oppositely poled region comprises about half of a volume of the magnet.

15. The vertical magnetic circuit of claim 13 wherein the transition zone is between about 5 percent and 15 percent of a volume of the magnet.

16. The vertical magnetic circuit of claim 13 wherein the dual pole magnet further comprises a coating to prevent particles from flaking off the dual-pole magnet.

17. The vertical magnetic circuit of claim 12 wherein the expanded bottom keeper comprises a flange having a thickness about equal to a thickness of the expanded bottom keeper.

18. The vertical magnetic circuit of claim 12 wherein the expanded bottom keeper comprises a flange having a thickness of about double a thickness of the expanded bottom keeper so that a tub is formed in which the dual-pole magnet is located.

19. The vertical magnetic circuit of claim 12 and further comprising a top keeper located above the coil to contain the magnetic field associated with the magnetic circuit.

* * * * *

UNITED STATES PATENT AND TRADEMARK OFFICE
CERTIFICATE OF CORRECTION

PATENT NO. : 6,671,132 B1
DATED : December 30, 2003
INVENTOR(S) : Peter Crane et al.

It is certified that error appears in the above-identified patent and that said Letters Patent is hereby corrected as shown below:

Column 9,
Line 9, delete "white" and insert -- while --

Signed and Sealed this

Fourteenth Day of September, 2004

JON W. DUDAS
*Director of the United States Patent and Trademark Office*